United States Patent [19]  [11]  4,293,386
Harand et al.  [45]  Oct. 6, 1981

[54] NUCLEAR REACTOR WITH A CYLINDRICAL REACTOR PRESSURE VESSEL

[75] Inventors: Elmar Harand, Höchstadt; Eberhard Michel, Nuremberg, both of Fed. Rep. of Germany

[73] Assignee: Kraftwerk Union Aktiengesellschaft, Mulheim an der Ruhr, Fed. Rep. of Germany

[21] Appl. No.: 14,366

[22] Filed: Feb. 23, 1979

[30] Foreign Application Priority Data

Feb. 24, 1978 [DE] Fed. Rep. of Germany ....... 2808104

[51] Int. Cl.³ ............................................. G21C 13/02
[52] U.S. Cl. ...................................... 376/461; 376/293
[58] Field of Search ....................................... 176/38, 87

[56] References Cited

U.S. PATENT DOCUMENTS 2,921,007  1/1960  Spinrad ............................ 176/87 X
3,801,454  4/1974  Kumpf ............................. 176/87 X
3,979,866  9/1976  Prescott .......................... 176/87 X
4,012,157  3/1977  Krause et al. ................... 176/87 X
4,035,974  7/1977  Kumpf ............................. 176/87 X
4,047,632  9/1977  Schilling ......................... 176/87 X
4,116,766  9/1978  Poindexter et al. .............. 176/87 X Primary Examiner—Peter A. Nelson
Attorney, Agent, or Firm—Herbert L. Lerner

[57] ABSTRACT

A nuclear reactor with a cylindrical reactor pressure vessel disposed in a reactor cavity formed in a concrete biological shield surrounding and spaced from the pressure vessel includes means for suspending the reactor pressure vessel from the concrete biological shield, the suspending means being a plurality of tension bolts distributed about the periphery of the cylindrical reactor pressure vessel and secured to a corresponding plurality of brackets attached to the cylindrical reactor pressure vessel, the tension bolts extending from the brackets at an inclined angle through the biological shield.

7 Claims, 4 Drawing Figures

NUCLEAR REACTOR WITH A CYLINDRICAL REACTOR PRESSURE VESSEL

The invention relates to a nuclear reactor with a cylindrical reactor pressure vessel and, more particularly, with such a reactor pressure vessel which is disposed in a reactor cavity formed in a biological shield of concrete surrounding and spaced from the pressure vessel and which is suspended from the concrete biological shield.

It has become known heretofore from German Patent DE-PS No. 2 101 965 to effect the suspension by means of a box girder or beam which is anchored to the concrete. In contrast thereto, it is an object of the invention of the instant application to provide a simpler and less costly solution.

With the foregoing and other objects in view, there is provided, in accordance with the invention, in a nuclear reactor with a cylindrical reactor pressure vessel disposed in a reactor cavity formed in a concrete biological shield surrounding and spaced from the pressure vessel, means for suspending the reactor pressure vessel from the concrete biological shield comprising a plurality of tension or draw-in bolts distributed about the periphery of the cylindrical reactor pressure vessel and secured to a corresponding plurality of brackets attached to the cylindrical reactor pressure vessel, the tension bolts extending from the brackets at an inclined angle through the biological shield. Such tension bolts are essentially stressed in tension, so that the force relationships are clear and predictable. Due to the distribution of the tension bolts about the periphery of the reactor pressure vessel, no substantial appreciable stiffening or reinforcement of the biological shield is necessary, because a uniform loading of the biological shield can be obtained with a plurality of such tension bolts.

Basically, the tension bolts are disposed as vertically as possible. However, in view of the penetration or extension thereof through the biological shield, in accordance with another feature of the invention, the tension bolts extend through the biological shield at an angle of between substantially 25Z° and 45° to the vertical, and preferably at an angle of about 35°.

In accordance with a further feature of the invention, a tube, respectively, surrounds each of the tension bolts, and means are provided for bracing the tension bolts against the respective tubes.

In accordance with yet another feature of the invention, the tube is formed of two parts serially disposed in longitudinal direction of the respective tension bolt, one of the two parts being located in the space between the cylindrical reactor pressure vessel and the biological shield in a manner that compressive forces are transmissible in longitudinal direction of the respective tension bolt by the one part of the biological shield. In this regard, the situation wherein the reactor pressure vessel is shifted upwardly by the pressure coolant, if the coolant should discharge or escape into the reactor cavity can be taken into account in a relatively simple manner. Such forces, as aforementioned, are then transmitted as compression forces from the one part of the tube to the biological shield.

In accordance with yet a further feature of the invention, a metal member is disposed on the biological shield, and a respective tension bolt having an end facing away from the reactor pressure vessel projects therewith through the metal member. Thereby, a stiffening or reinforcement of the biological shield is achieved by the simplest means. A similar metal member can be provided on the end of the tension bolts facing toward the reactor pressure vessel to absorb the hereinaforementioned compression forces.

In accordance with an added feature of the invention, horizontal support means are associated with the respective tension bolts and extend between the reactor pressure vessel and the biological shield. With such support means, lateral forces can be intercepted which would otherwise stress the tension bolts in bending.

In accordance with a concomitant feature of the invention, the horizontal support means surround the respective tension bolts so that additional stiffening for situations of extreme loading is afforded. This is true especially for the situation wherein a steel plate surrounding the reactor pressure vessel is used as the support means, and engages several paw guides or brackets distributed about the periphery of the pressure vessel, if desired, by means of vertical guide jaws.

Other features which are considered as characteristic for the invention are set forth in the appended claims.

Although the invention is illustrated and described herein as embodied in nuclear reactor with a cylindrical reactor pressure vessel, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
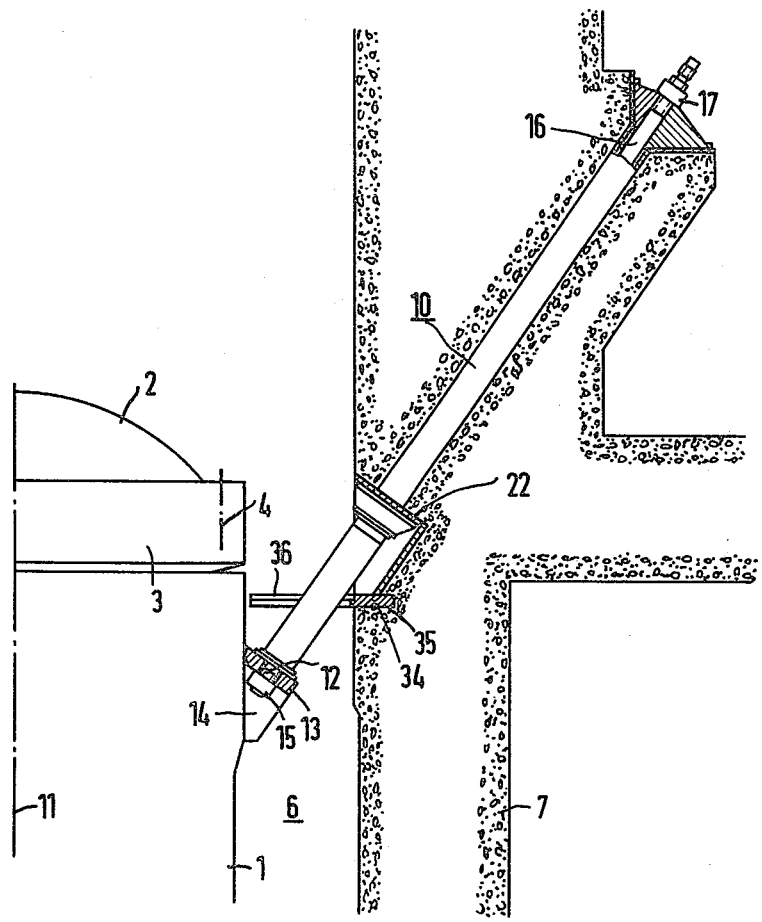
FIG. 1 is a partly diagrammatic, partly sectional fragmentary view of a reactor pressure vessel constructed in accordance with the invention.

Referring now to the drawing and first, particularly, to FIG. 1 thereof, there is shown an upper portion of a metallic reactor pressure vessel 1 for a pressurized-water reactor of 1300 MWe, which is closed by a cover 2. A flange ring 3 of the cover 2 is shown in FIG. 1, with which fastening screws represented by a dash-dot line 4 engage.

Figure 2:
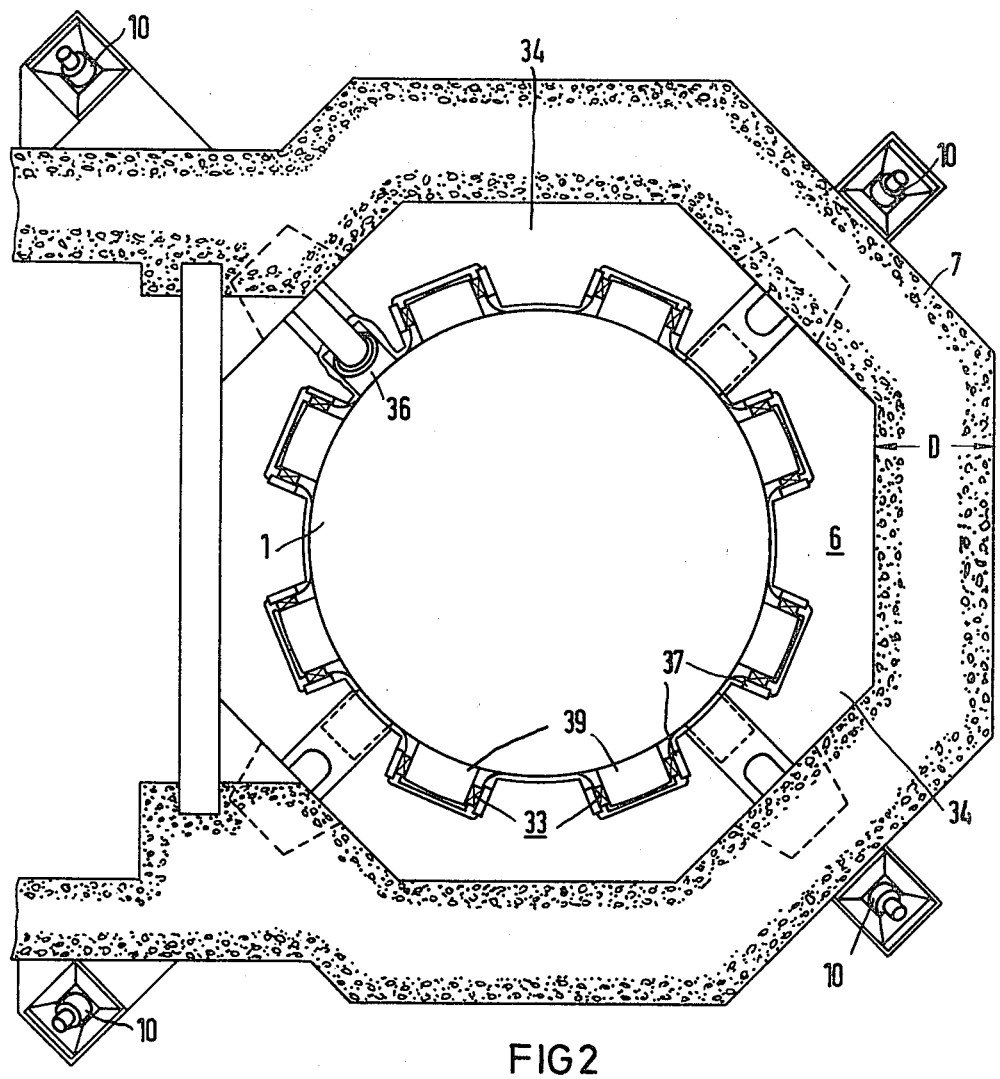
FIG. 2 is a partly sectional, top plan view of the reactor pressure vessel with a bracing or support therefor.

The reactor pressure vessel 1 is seated centrically in a so-called reactor cavity 6, as shown in FIG. 2. This cavity 6 is a recess formed in a biological shield 7 consisting of concrete and surrounding the reactor pressure vessel 1 as shielding. The biological shield 7 is a reinforced concrete wall which has, for example, a thickness D of 2 m. The reactor pressure vessel 1 is suspended from the reinforced concrete wall 7 by four tension bolts 10.

The tension bolts 10 are formed of high-tensile steel. They have a diameter of, for example, 240 mm and are disposed at an angle of 35° to the vertical longitudinal axis 11 of the reactor pressure vessel 1. The end 12 of the bolts 10 facing toward the reactor pressure vessel 1 engages in paw supports or brackets 13, which are welded to the reactor pressure vessel 1. The paw supports 13 can be constructed, with the aid of side members 14, in the form of a hood, so that the holding or retaining forces are introduced over a large area into the reactor pressure vessel 1. In the interior of the hood-like structure, a clamping or retaining nut 15 is seated and is secured against unintentional loosening.

Figure 3:
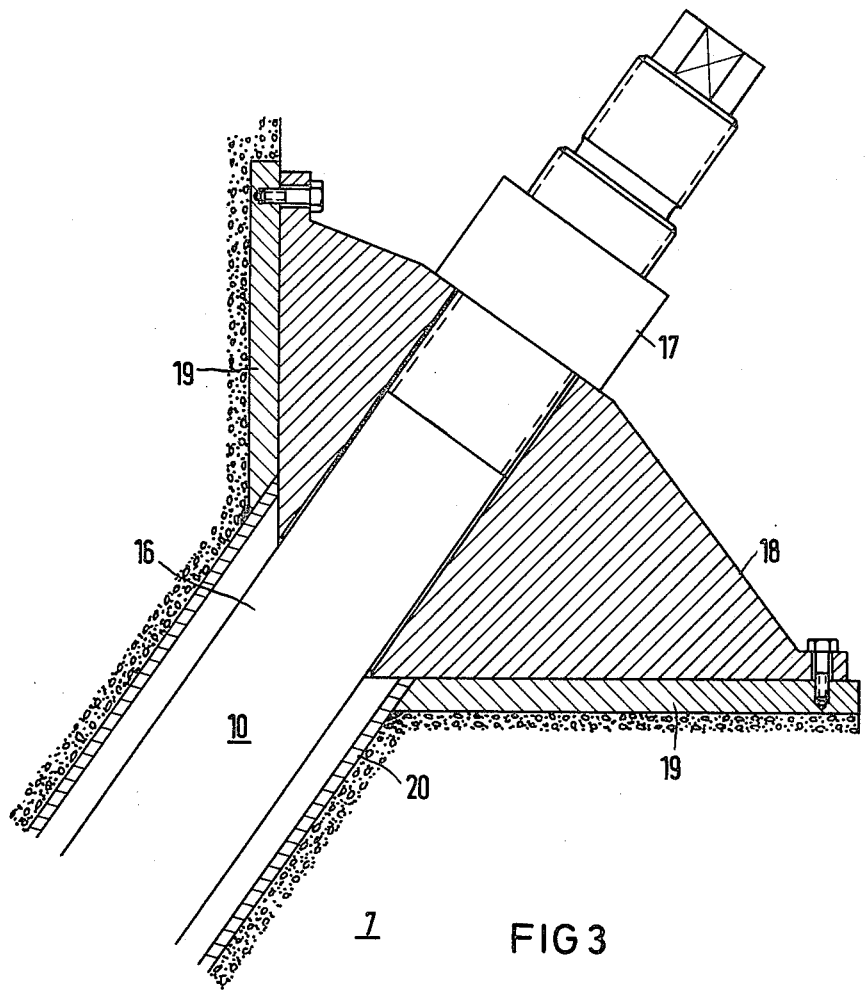
FIGS. 3 and 4 are enlarged fragmentary views of FIG. 1 showing details of a tension bolt forming part of a suspension system for the reactor pressure vessel.

The end 16 of the tension bolts 10 facing away from the reactor pressure vessel 1 also carries a retaining nut 17 which is seated on an equalizing member 18 (FIG. 3) of substantially triangular cross section that is bolted to metallic lining sheets 19 of the biological shield 7. The metallic lining sheets 19 are welded to a steel tube 20 which surrounds the tension bolt 10 and extends through the concrete. Also, at the tensionbolt end 16, a suitable securing device can be provided which prevents the nut 17 from becoming loosened.

Figure 4:
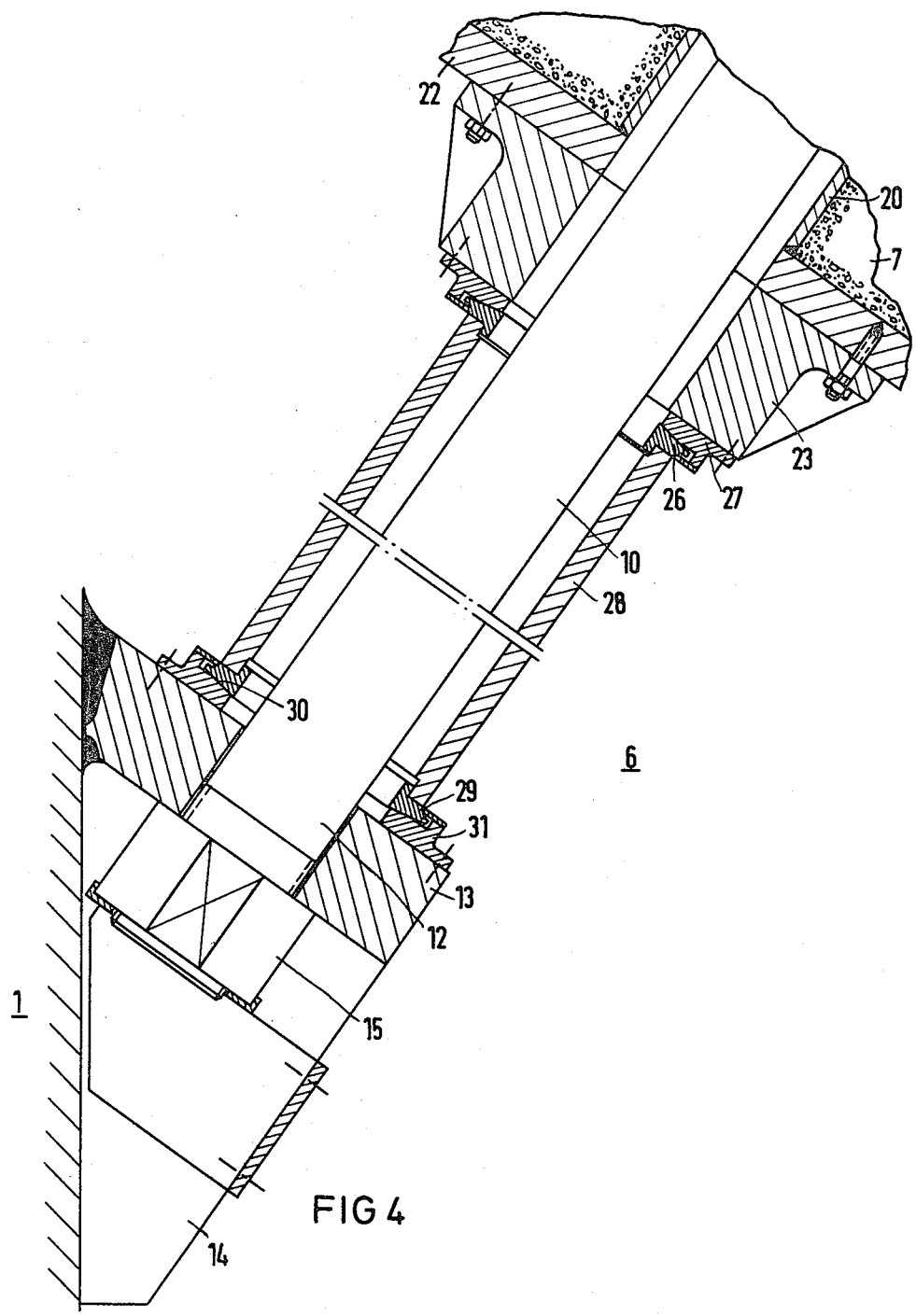

As shown in FIG. 4, a steel plate 22, which carries a support or bracing member 23, is welded to the lower end of the steel tube 20. On the support member 23, in turn, there is seated on the inside of the biological shield 7 i.e. in the region of the reactor cavity 6, a support or bracing ring 26, which extends, with a spherically rounded or convex surface, into a matching opposing member 27. Between the support ring 26 and the respective paw support or bracket 13, a support or bracing tube 28 is disposed as an extension or elongation of the steel tube 20, the support tube 28 being braced by end members 29, formed with a likewise spherical contact surface 30, in a respective matching support 31.

The tension bolt 10 can be tightened relative to the serially disposed tubes 20 and 28 so that a stable or strong mounting support is produced. Simultaneously, the tube 28 is also capable of absorbing compressive forces which can be produced if the reactor pressure vessel 1 should "rise".

The tension bolts 10 should, in substance, only absorb the weight forces of the reactor pressure vessel 1. For this purpose, they can also be distributed in greater numbers, for example, between six and twenty, around the periphery of the reactor pressure vessel 1.

Lateral forces, which would act as bending forces on the tension bolts 10, are absorbed, on the other hand, by eight supports 33 which extend between the reactor pressure vessel 1 and the biological shield 7. In the illustrated embodiment of the invention, the supports 33 are embraced by an annular steel plate 34, which is let into or embedded in the concrete of the biological shield 7 at 35 and surrounds the tension bolts 10 with a cutout or recess 36. Vertical guide jaws 37 are attached or applied to the steel plate 34. They engage pairwise in paws or lugs 39 attached to the reactor pressure vessel 1 in such a manner that thermal expansion of the reactor pressure vessel 1 can be absorbed free of any forces in horizontal direction.

We claim:

1. In a nuclear reactor with a cylindrical reactor pressure vessel disposed in a reactor cavity formed in a concrete biological shield surrounding and spaced from the pressure vessel, means for suspending the reactor pressure vessel from the concrete biological shield comprising a plurality of tension bolts distributed about the periphery of the cylindrical reactor pressure vessel and secured to a corresponding plurality of brackets attached to the cylindrical reactor pressure vessel for suspending the pressure vessel from said tension bolts, said tension bolts extending from said brackets at an inclined angle through the biological shield and being anchored to the biological shield.

2. Nuclear reactor according to claim 1 wherein said tension bolts extend through the biological shield at an angle of between substantially 25° and 45° to the vertical.

3. Nuclear reactor according to claim 1 including a tube respectively surrounding each of said tension bolts, and means for bracing said tension bolts against the respective tubes.

4. Nuclear reactor according to claim 3 wherein said tube is formed of two parts serially disposed in longitudinal direction of the respective tension bolt, one of said two parts being located in the space between the cylindrical reactor pressure vessel and the biological shield in a manner that compressive forces are transmissible in longitudinal direction of the respective tension bolt by said one part to the biological shield.

5. Nuclear reactor according to claim 1 including a metal member disposed on the biological shield, and a respective tension bolt having an end facing away from the reactor pressure vessel projects therewith through said metal member.

6. Nuclear reactor according to claim 1 comprising horizontal support means associated with the respective tension bolts and extending between the reactor pressure vessel and the biological shield.

7. Nuclear reactor according to claim 6 wherein said horizontal support means surround the respective tension bolts.

* * * * *